(12) United States Patent
Fang et al.

(10) Patent No.: US 8,755,628 B2
(45) Date of Patent: Jun. 17, 2014

(54) IMAGE DE-HAZING BY SOLVING TRANSMISSION VALUE

(75) Inventors: Hui Fang, Mountain View, CA (US); Vivek Kwatra, Santa Clara, CA (US); Meng Zhang, Shanghai (CN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/609,112

(22) Filed: Sep. 10, 2012

(65) Prior Publication Data

US 2014/0072216 A1 Mar. 13, 2014

(30) Foreign Application Priority Data

Sep. 10, 2012 (CN) .......................... 2012 1 0331338

(51) Int. Cl.
*G06K 9/40* (2006.01)
(52) U.S. Cl.
USPC ........................................................ 382/274
(58) Field of Classification Search
None
See application file for complete search history.

(56) References Cited

U.S. PATENT DOCUMENTS

2011/0188775 A1* 8/2011 Sun et al. ...................... 382/274

OTHER PUBLICATIONS

Fang et al "Improved Single Image Dehazing Using Segmentation" IEEE 2010.*
He et al "Single Image Haze Removal Using Dark Channel Prior" IEEE Transactions on Pattern Analysis and Machine Intelligence published online Aug. 31, 2010.*
He, K., et al., "Single Image Haze Removal Using Dark Channel Prior," IEEE Conference on Computer Vision and Pattern Recognition, CVPR 2009, pp. 1-8.
Kim, J.-H., et al., "Single Image Dehazing Based on Contrast Enhancement," IEEE Conference on Acoustics, Speech and Signal Processing, 2011, pp. 1273-1276.

* cited by examiner

*Primary Examiner* — Sean Motsinger
(74) *Attorney, Agent, or Firm* — Fenwick & West LLP (57) ABSTRACT

An image processing server performs haze-removal from images. Global atmospheric light is estimated and an initial transmission value is estimated. In one embodiment, a solver is applied to an objective function to recover a scene radiance value based on the estimated atmospheric light and estimated transmission value. The scene radiance value is used to construct an image without haze. In a simplified method that avoids using a solver, bilateral filtering is performed on the transmission image in order to construct an image without haze.

20 Claims, 4 Drawing Sheets

IMAGE DE-HAZING BY SOLVING TRANSMISSION VALUE

BACKGROUND

1. Field of Art

The present disclosure generally relates to the field of digital image processing, and more specifically, to methods of removing haze from images.

2. Description of Related Art

When a photograph is taken of a scene in which haze or fog is present in the atmosphere, it degrades the content of the resulting image. The color of the objects in the scene are blended with light reflected from the atmosphere. Such blending is more severe when the object is further away from the camera.

To counter the effects of haze, several de-hazing methods have been proposed to improve image quality. One class of techniques relies on enhancing the contrast of an image, example of which are described in "Single Image Dehazing Based on Contrast Enhancement" by Jin-Hwan Kim, Jae-Young Sim, and Chang-Su Kim, IEEE International Conference on Acoustics, Speech and Signal Processing, May 2011. Such techniques are computationally intensive and typically take on the order of 10 seconds to complete. Another class of techniques relies on a dark channel prior, an example of which is described in "Single Image Haze Removal Using Dark Channel Prior" by Kaiming He, Jian Sun, and Xiaoou Tang, IEEE Conference on Computer Vision and Pattern Recognition, June 2009. In this example, a dark channel prior is proposed to remove haze from a single input image. Observing that most local patches in haze-free outdoor images contain some pixels having very low intensities in at least one color channel, a dark channel prior is used with a haze imaging model to estimate the thickness of the haze.

SUMMARY

Embodiments of the invention provide computationally fast image de-hazing without relying on a dark channel prior. The global atmospheric light is estimated for the image. In one embodiment, k-means clustering is performed on the image colors, and the color with the largest value from all the mean values is selected as the estimate for the atmospheric light. An initial transmission value is also estimated, wherein the transmission describes the portion of light that is not scattered and reaches the camera. With initial estimates for atmospheric light and transmission values, a solver is applied to minimize an objective function to recover the scene radiance, atmospheric light, and medium transmission from the observed intensity of the image. From the recovered scene radiance, the image can be constructed without haze.

In another embodiment, the application of a computationally intensive solver is avoided by instead applying bilateral filtering to the transmission image to obtain an estimate for the scene radiance. Accordingly, an image can be constructed without haze from the obtained estimate for the scene radiance.

Other embodiments include an image processing server and a non-transitory computer-readable storage medium for providing image de-hazing according to the techniques described above.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

Overview

Embodiments of the invention remove haze from images of scenes that are affected by haze. The amount of haze affecting the color of individual pixels of the image may vary across the image. For example, pixels from objects in the foreground of an image may have little haze while pixels from objects at a significantly further distance from the camera may have more haze. Thus, it is desirable to model the amount of haze in an image on a pixel by pixel basis. Two neighboring areas in an image with similar underlying appearance (e.g., color of the underlying surface) should exhibit a change in observed appearance (in the image) only due to a change in haze between the two neighboring areas. In this case, the change in the observed appearance between two neighboring areas should be the same as the change in haze between the two areas. Thus, embodiments of the invention use the change in appearance between pairs of areas to estimate a change in haze across those areas based on a measure of similarity of the underlying appearance of the areas.

In one common model of the amount of haze in an image, the observed pixel intensity I(x) of a given pixel in an image is determined by a combination of scene radiance J(x) and the global atmospheric light A. The relationship of these components is represented by the following equation:

$$I(x)=J(x)t(x)+A(1-t(x)) \qquad (1)$$

where t(x) represents the medium transmission describing the portion of the light that is not scattered from the atmosphere and reaches the camera. In this model, t(x) has a value between 0 and 1. The goal of haze removal is to recover J, A, and t from I.

System Architecture

Figure 1:
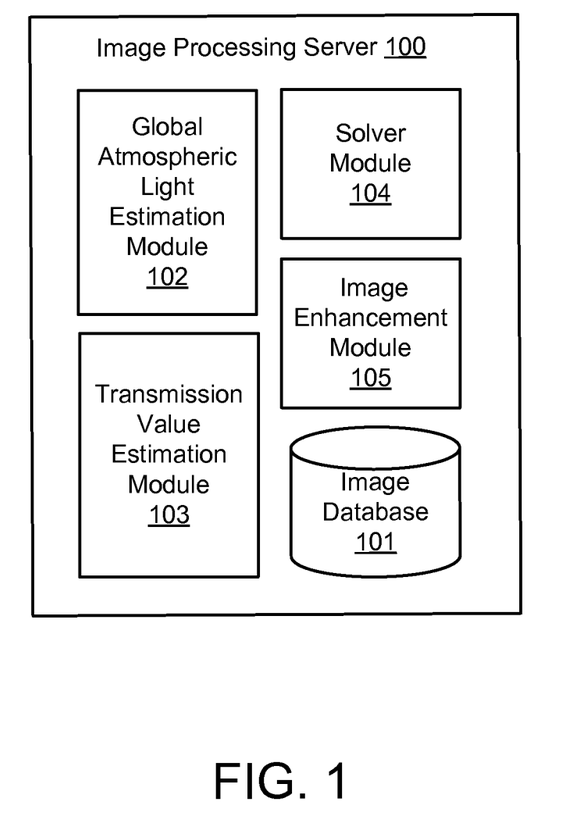
FIG. 1 is a high-level block diagram of an image processing server in accordance with an embodiment.

FIG. 1 is a high-level block diagram illustrating a detailed view of an image processing server 100 for removing haze from images in accordance with one embodiment. The image processing server 100 includes an image database 101, a global atmospheric light estimation module 102, a transmission value estimation module 103, a solver module 104, and an image enhancement module 105. As is known in the art, the term "module" refers to computer program logic utilized to provide the specified functionality. Thus, a module can be implemented in hardware, firmware, and/or software. In one embodiment, program modules are stored on a non-transitory storage device (i.e., a computer program product), loaded into a memory, and executed by a computer processor. Additionally, those of skill in the art will recognize that other embodiments of the image processing server 100 shown in FIG. 1 can have different and/or other modules than the ones described here, and that the functionalities can be distributed among the modules in a different manner.

The image database 101 stores images. The term "image" as employed herein includes image data in general, such as individual still image files or frames of images from a video file. In one embodiment, the images in the image database 101 may be obtained from a variety of sources, such as from an organization producing aerial or street view images of a portion of a city for use with a map system, such as GOOGLE MAPS, STREET VIEW or GOOGLE EARTH. Likewise, images (including videos) may be obtained from users, e.g. as submitted by a user uploading images to a photo repository such as PICASA WEB, or a video repository such as YOU-TUBE or GOOGLE VIDEO. Additionally, the image database 101 stores enhanced versions of the images. In one embodiment, an enhanced version of an image comprises the image with hazing effects removed.

The global atmospheric light estimation module 102 of the image processing server 100 estimates the value of A from an image. In one embodiment, the global atmospheric light estimation module 102 applies a k-means clustering (e.g., k is equal to 16) on the image colors. As a result, the image is divided into a plurality of k pixel clusters where each cluster has an associated color value corresponding to an average color value of the pixels in the cluster. Then the global atmospheric light estimation module 102 selects the largest value (i.e., the brightest color) from the average color values as the estimate for the global atmospheric light. Alternatively, the estimate for the global atmospheric light can be made in other ways. For example, the value of the brightest pixel can be selected as the estimate for the global atmospheric light in one embodiment. Another option is to allow the value of A from an image to be specified interactively by a user.

The transmission value estimation module 103 of the image processing server 100 estimates the initial transmission value for an image. In one embodiment, the initial transmission value is estimated from the following equation:

$$t(x) = 1 - \omega \min_c \left( \frac{I^c(y)}{A^c} \right) \quad (2)$$

where $\omega$ is a constant parameter, $0 < \omega \le 1$, y is a local patch of pixels centered at point x, $I^c$ is a color channel of I, and $A^c$ is a color channel of A. In one embodiment, a smaller $\omega$ reduces contrast in the results, and $\omega$ is set empirically to control final effects. The inventors have observed that good results can be achieved with per-pixel sampling, in contrast to sampling a dark channel within a fixed window size, choosing the minimum value, and refining the result with soft matting. The former tends to be much faster than the latter.

The solver module 104 of the image processing server 100 applies a solver to minimize the following objective function to recover J, A, and t from I:

$$\text{Let } s = \log(t), \text{ then} \quad (3)$$

$$t^* = \exp(s^*),$$

-continued $$\text{where } s^* = \operatorname{argmin}_s \sum_j p_{ij} s_{ij}^2 + \sum_j w_{ij} (s_{ij} - d_{ij})^2 + v_i s_i^2$$

where p is a smoothness weighting term, which may be, for example $e^{-\gamma \|g(I_i) - g(I_j)\|}$. The smoothness weighting term is an estimate of similarity between neighboring areas. If neighboring areas are similar (as measured by the gradients g between h and $I_i$ and $I_j$), the smoothness weighting term increases the smoothness between the neighboring areas. If neighboring areas are dissimilar, then it is likely that the underlying surface changed (i.e., crossing a threshold between different objects in the scene) and the smoothness is decreased. A large smoothness weighting term between two pixels encourages a similar transmission value between them. The $\gamma$ is a parameter usually chosen empirically, and the parameter is constant per i, j pair, but may be chosen differently per image, for example, based on the overall contrast or variance of the image. Referring again to the objective function, the expression $s_{ij}$ is defined as $s_i - s_j$. The second term of the objective function is a data term. The data term means that for pixels coming from the same surface, the difference in log-transmissions should explain the difference in mean gradients around those pixels. In this example, mean gradients are used as a means to characterize the surface. Thus, in the data term, $d_{ij} = \log(\text{mg}(I_i)) - \log(\text{mg}(I_j))$, which is the difference of the original image's mean-gradient value under log domain. Further, for the data weighting term, $w_{ij}$, the similarity of normalized mean gradients are used as a way to determine whether pixels belong to the same surface. The normalization makes the measure invariant to the transmission value t at those pixels. In one embodiment, the term $$w_{ij} = e^{-\gamma \left| \frac{mg(I_i - A)}{m(I_i - A)} - \frac{mg(I_j - A)}{m(I_j - A)} \right|},$$

which in one embodiment, is calculated iteratively. The last term of the objective function, $v_i s_i^2$, constrains the result of minimizing the objective function from being too far away from an initial estimation. The term $v_i$ is an absolute gradient, and in one embodiment, $v_i$ is used as a regularization weighting term that attempts to minimize $s_i$ (i.e., drives $s_i$ towards zero) which is equivalent to saying that the term prefers a solution implying no transmission loss (i.e., $t_i$ is approximately equal to 1). This makes most sense when the absolute gradients are large, because a large gradient implies there was low attenuation in pixel color due to haze.

For the above description of the parameters that are used to compute weights for the various terms of the objective function, it is noted that these parameters may be learned automatically based on a set of image data including images with haze and without haze. For example, image data could be collected of a scene both with the presence of haze and in the absence of haze (for example using time-lapse photography). Then a search could be conducted for parameters that result in the best reconstruction of the haze-free original scene from the hazy input.

In one embodiment, minimizing the objective function is a least squares problem, which can be solved iteratively by the solver module 104, as is known to those of skill in the art. In one method, a conjugate gradient algorithm familiar to those of skill in the art is used by the solver module 104.

The image enhancement module 105 constructs images based on the recovered values for J, A, and t from I as solved by the solver module 104 described above. The values for J represent the scene radiance for each pixel with the effects of haze absent from the image. The image enhancement module 105 stores the enhanced image (i.e., the image with hazing effects removed) in the image database 101.

Example Haze Removal Methods

Figure 2:
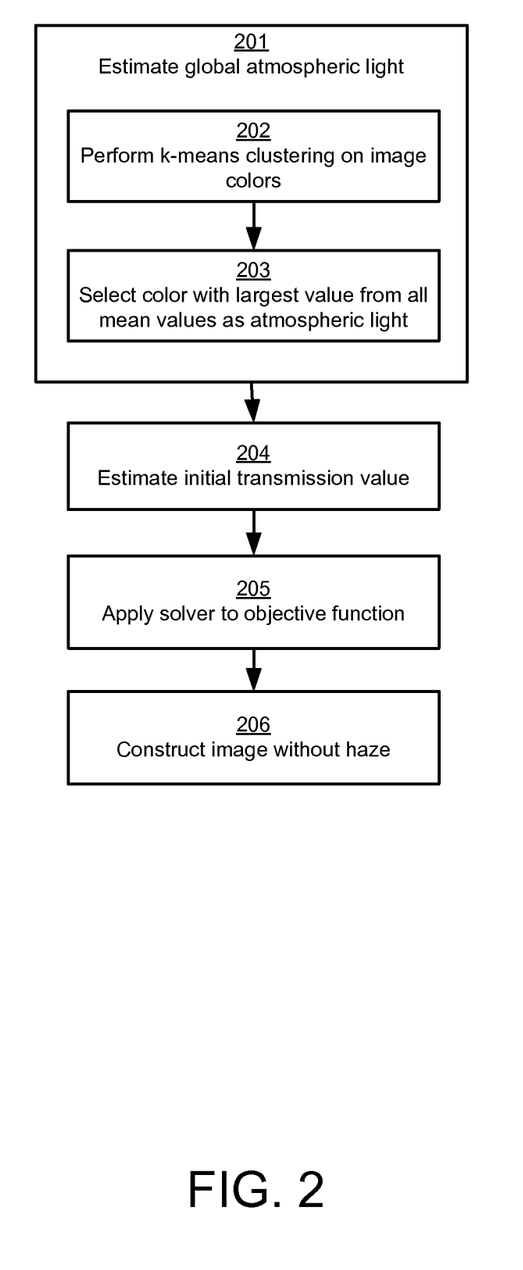
FIG. 2 is a flowchart illustrating a method to remove haze from an image, in accordance with an embodiment.

FIG. 2 is a flowchart illustrating a method, performed by the image processing server 100 for example, to remove haze from images, according to one embodiment. Other embodiments perform the illustrated steps in different orders, and/or perform different or additional steps.

First, the global atmospheric light of an image is estimated 201. In one embodiment, k-means clustering is performed 202 on the image colors, and the color with the largest value from all mean values is selected 203 as the estimate of the atmospheric light.

An initial transmission value is estimated 204. In one embodiment, the initial transmission value is estimated according to Eq. 2 described above. In other embodiments, the initial transmission value may be estimated in other ways.

With estimates of the global atmospheric light and the initial transmission value already identified, a solver is applied 205 to the objective function of Eq. 3 described above, in order to recover J, A, and t from I. For example, the solver may use a least squares technique or a conjugate gradient algorithm to obtain a solution.

According to the solution obtained, the image without haze is constructed 206. The image subsequently can be saved or otherwise output for display, use, or further processing.

Figure 3:
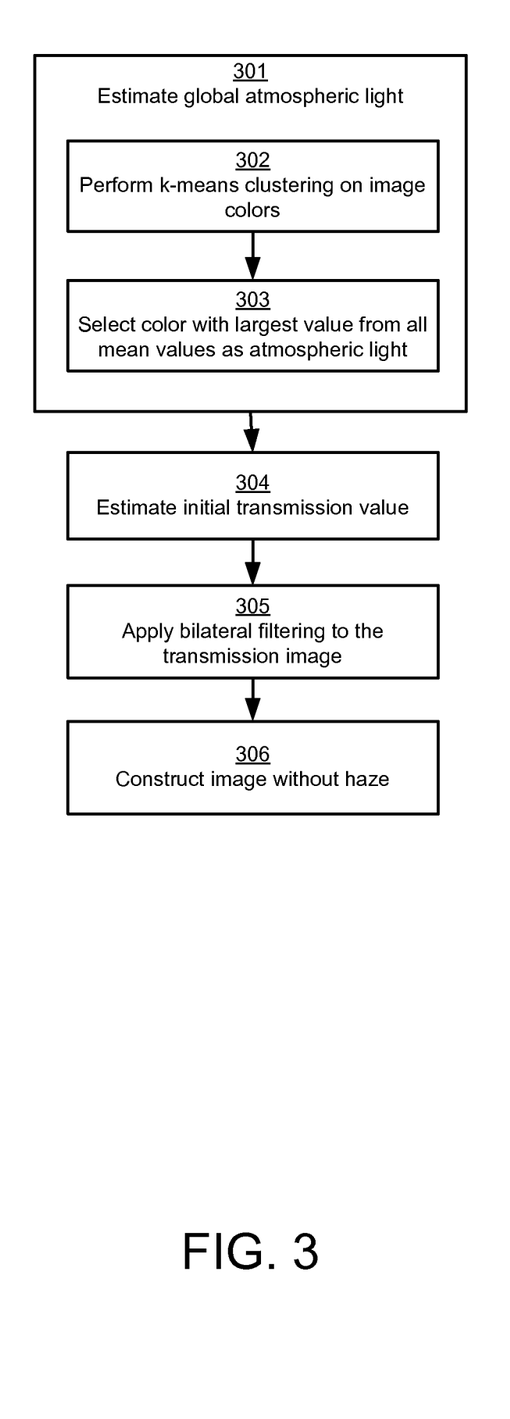
FIG. 3 is a flowchart illustrating a method to remove haze from an image without using a solver, in accordance with an embodiment.

FIG. 3 is a flowchart illustrating a method, performed by the image processing server 100 for example, to remove haze from images according to another embodiment, where dehazing can be completed without a solver. Other embodiments perform the illustrated steps in different orders, and/or perform different or additional steps.

Steps 301-304 of FIG. 3 are similar to steps 201-204 described above with reference to FIG. 2. However, instead of applying a solver as in step 205 of FIG. 2, in step 305 according to the method of FIG. 3, bilateral filtering is applied to the transmission image. A bilateral filter is an edge-preserving and noise reducing smoothing filter where the intensity value at each pixel in an image is replaced by a weighted average of intensity values from nearby pixels, wherein the weight is based on a Gaussian distribution. The weights depend not only on Euclidean distance, but also on the differences in color intensity, so that sharp edges are preserved. Thus, for example, the surface of a building may be smoothed, but the edge of the building may remain sharp. In other embodiments, alternative smoothing algorithms, such as Gaussian smoothing or other edge-preserving smoothing filters can be used for similar or slightly worse effects.

According to the solution obtained from the application of bilateral filtering, the image without haze is constructed 306. The image subsequently can be saved or otherwise output for display, use, or further processing.

Example Computer Components

Figure 4:
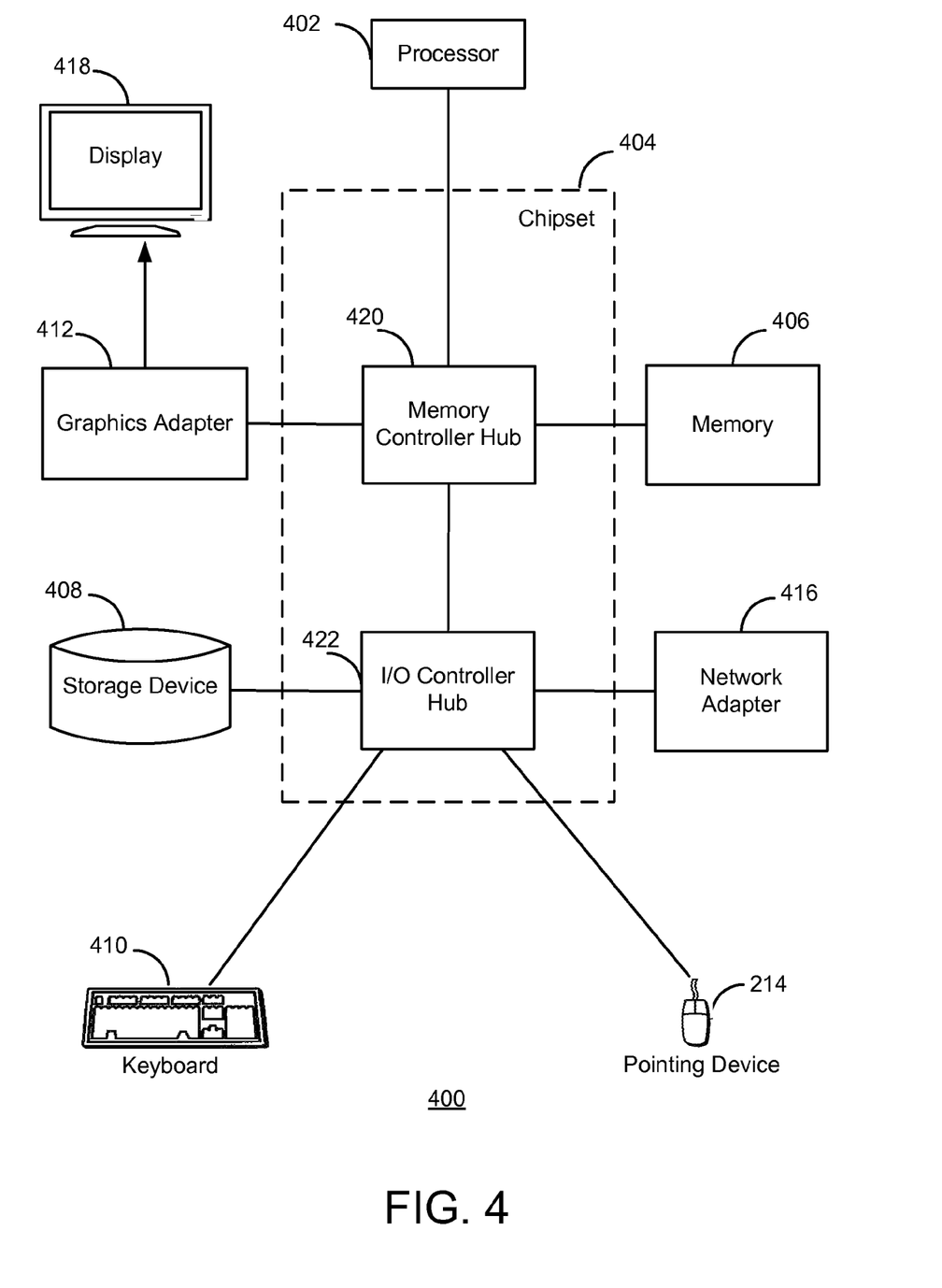
FIG. 4 is a high-level block diagram illustrating a typical computer for use as an image processing server according to an embodiment.

FIG. 4 is a high-level block diagram of a computer 400 for acting as an image processing server 100 according to one embodiment. Illustrated are at least one processor 402 coupled to a chipset 404. Also coupled to the chipset 404 are a memory 406, a storage device 408, a keyboard 410, a graphics adapter 412, a pointing device 414, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The pointing device 414 may be a mouse, track ball, or other type of pointing device, and is used in combination with the keyboard 410 to input data into the computer system 400. The graphics adapter 412 displays images and other information on the display 418. The network adapter 416 couples the computer system 400 to a local or wide area network.

As is known in the art, a computer 400 can have different and/or other components than those shown in FIG. 4. In addition, the computer 400 can lack certain illustrated components. In one embodiment, a computer 400 acting as an image processing server 100 lacks a keyboard 410, pointing device 414, graphics adapter 412, and/or display 418. Moreover, the storage device 408 can be local and/or remote from the computer 400 (such as embodied within a storage area network (SAN)). As is known in the art, the computer 400 is adapted to execute computer program modules for providing functionality previously described herein. In one embodiment, program modules are stored on the storage device 408, loaded into the memory 406, and executed by the processor 402.

Additional Configuration Considerations

The disclosure herein has been described in particular detail with respect certain embodiments. Those of skill in the art will appreciate that other embodiments may be practiced. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments disclosed herein include process steps and instructions described herein in the form of an algorithm. It should be noted that the process steps and instructions could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for enablement and best mode of the present invention.

The embodiments disclosed herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. A computer-implemented method of removing haze from an image, the method performed by a computer and comprising:
   estimating global atmospheric light from the image, the estimating comprising:
      performing k-means clustering on colors of the image to obtain a plurality of mean values; and
      selecting a largest value from the plurality of mean values as an estimate of global atmospheric light;
   estimating an initial transmission value t from the image;
   estimating a change in haze across neighboring areas of the image based, at least in part on the estimated global atmospheric light from the image and the estimated initial transmission value, the change in haze represented by a measure of similarity between the neighboring areas and a change in appearance between the neighboring areas in the image; and
   constructing the image without haze using the estimated change in haze.

2. The computer-implemented method of claim 1, wherein estimating an initial transmission value from the image comprises estimating the initial transmission value t(x) from $$t(x) = 1 - \omega \min_c \left( \frac{I^c(y)}{A^c} \right),$$

wherein c is a selected color channel, $\omega$ is a constant parameter, $0 < \omega \le 1$, y is a local patch of pixels of the image centered at point x, $I^c$ is an observed intensity I of the selected color channel, and $A^c$ is atmospheric light A of the selected color channel.

3. The computer-implemented method of claim 1, wherein estimating a change in haze across neighboring areas of the image comprises:
   applying a solver to minimize an objective function by letting s=log(t) and defining the objective function as t*=exp(s*),
   where $$s^* = \mathrm{argmin}_s \sum_j p_{ij} s_{ij}^2 + \sum_j w_{ij}(s_{ij} - d_{ij})^2 + v_i s_i^2,$$

where is a smoothness weighting term that estimates a similarity between neighboring areas, is $s_{ij}$ is $s_i$-$s_j$, $w_{ij}$ a data weighting term, $d_{ij}$ is a difference of the original image's mean-gradient value under log domain, and $v_i$ is a regularization weighting term and is the absolute gradient.

4. The computer-implemented method of claim 3, wherein the solver comprises an iterative least squares solver.

5. The computer-implemented method of claim 3, wherein the solver comprises a conjugate gradient algorithm.

6. The computer-implemented method of claim 3, wherein at least one parameter used to compute the smoothness weighting term, the data weighting term, or the regularization weighting term is learned automatically based on a set of image data including images with haze and without haze.

7. A computer-implemented method of removing haze from an image, the method performed by a computer and comprising:
   estimating global atmospheric light from the image, the estimating comprising:
      performing k-means clustering on colors of the image to obtain a plurality of mean values; and
      selecting a largest value from the plurality of mean values as an estimate of global atmospheric light;
   estimating an initial transmission value from the image;
   applying bilateral filtering to a transmission image based, at least in part, on the estimated global atmospheric light from the image and the estimated initial transmission value; and
   constructing the image without haze using the filtered transmission image.

8. The computer-implemented method of claim 7, wherein estimating an initial transmission value from the image comprises estimating the initial transmission value t(x) from $$t(x) = 1 - \omega \min_c \left( \frac{I^c(y)}{A^c} \right),$$

wherein c is a selected color channel, $\omega$ is a constant parameter, $0 < \omega \le 1$, y is a local patch of pixels of the image centered at point x, $I^c$ is an observed intensity I of the selected color channel, and $A^c$ is atmospheric light A of the selected color channel.

9. The computer-implemented method of claim 7, wherein applying bilateral filtering comprises replacing an intensity value at each pixel in the image with a weighted average of intensity values from nearby pixels, wherein the weight is based on a Gaussian distribution, and wherein the weight depends on distance and differences in color intensity.

10. A non-transitory computer-readable storage medium storing computer-executable code for removing haze from an image, the code executable to perform steps comprising:

estimating global atmospheric light from the image, the estimating comprising:
performing k-means clustering on colors of the image to obtain a plurality of mean values; and
selecting a largest value from the plurality of mean values as an estimate of global atmospheric light;
estimating an initial transmission value t from the image;
estimating a change in haze across neighboring areas of the image based, at least in part, on the estimated global atmospheric light from the image and the estimated initial transmission value, the change in haze represented by a measure of similarity between the neighboring areas and a change in appearance between the neighboring areas in the image; and
constructing the image without haze using the estimated change in haze.

11. The medium of claim 10, wherein the code executable to perform estimating an initial transmission value from the image comprises code executable to perform estimating the initial transmission value t(x) from $$t(x) = 1 - \omega \min_c \left( \frac{I^c(y)}{A^c} \right),$$

wherein c is a selected color channel, ω is a constant parameter, 0<ω<1, y is a local patch of pixels of the image centered at point x, $I^c$ is an observed intensity I of the selected color channel, and $A^c$ is atmospheric light A of the selected color channel.

12. The medium of claim 10, wherein the code executable to perform estimating a change in haze across neighboring areas of the image comprises code executable to perform:
applying a solver to minimize an objective function by letting s=log(t), and defining the objective function as t*=exp(s*),
where $$s^* = \text{argmin}_s \sum_j p_{ij} s_{ij}^2 + \sum_j w_{ij}(s_{ij} - d_{ij})^2 + v_i s_i^2,$$

where $p_{ij}$ is a smoothness weighting term that estimates a similarity between neighboring areas, $s_{ij}$ is $s_i$-$s_j$, $w_{ij}$ is a data weighting term, $d_{ij}$ is a difference of the original image's mean-gradient value under log domain, and $v_i$ is a regularization weighting term and is the absolute gradient.

13. The medium of claim 12, wherein the solver comprises an iterative least squares solver.

14. The medium of claim 12, wherein the solver comprises a conjugate gradient algorithm.

15. The medium of claim 12, wherein at least one parameter used to compute the smoothness weighting term, the data weighting term, or the regularization weighting term is learned automatically based on a set of image data including images with haze and without haze.

16. A non-transitory computer-readable storage medium storing computer-executable code for removing haze from an image, the code executable to perform steps comprising:
estimating global atmospheric light from the image, the estimating comprising:
performing k-means clustering on colors of the image to obtain a plurality of mean values; and
selecting a largest value from the plurality of mean values as an estimate of global atmospheric light;
estimating an initial transmission value from the image;
applying bilateral filtering to a transmission image based, at least in part, on the estimated global atmospheric light from the image and the estimated initial transmission value; and
constructing the image without haze using the filtered transmission image.

17. The medium of claim 16, wherein the code executable to perform estimating an initial transmission value from the image comprises code executable to perform estimating the initial transmission value t(x) from $$t(x) = 1 - \omega \min_c \left( \frac{I^c(y)}{A^c} \right),$$

wherein c is a selected color channel, ω is a constant parameter, 0<ω≤1, y is a local patch of pixels of the image centered at point x, $I^c$ is an observed intensity I of the selected color channel, and $A^c$ is a color channel of the atmospheric light A of the selected color channel.

18. The medium of claim 16, wherein the code executable to perform applying bilateral filtering comprises code executable to perform replacing an intensity value at each pixel in the image with a weighted average of intensity values from nearby pixels, wherein the weight is based on a Gaussian distribution, and wherein the weight depends on distance and differences in color intensity.

19. A computer system for removing haze from an image, the system comprising:
a computer processor; and
a non-transitory computer-readable storage medium storing executable instructions configured to execute on the computer processor, the instructions when executed by the computer processor are configured to perform steps comprising:
estimating global atmospheric light from the image, the estimating comprising:
performing k-means clustering on colors of the image to obtain a plurality of mean values; and
selecting the largest value from the plurality of mean values as an estimate of global atmospheric light;
estimating an initial transmission value t from the image;
estimating a change in haze across neighboring areas of the image based, at least in part, on the estimated global atmospheric light from the image and the estimated initial transmission value, the change in haze represented by a measure of similarity between the neighboring areas and a change in appearance between the neighboring areas in the image; and
constructing the image without haze using the estimated change in haze.

20. A computer system for removing haze from an image, the system comprising:
a computer processor; and
a non-transitory computer-readable storage medium storing executable instructions configured to execute on the computer processor, the instructions when executed by the computer processor are configured to perform steps comprising:
estimating global atmospheric light from the image, the estimating comprising:
performing k-means clustering on colors of the image to obtain a plurality of mean values; and selecting the largest value from the plurality of mean values as an estimate of global atmospheric light;
estimating an initial transmission value from the image;
applying bilateral filtering to a transmission image based, at least in part, on the estimated global atmospheric light from the image and the estimated initial transmission value; and
constructing the image without haze using the filtered transmission image.

* * * * *